US008443772B2

(12) United States Patent
Kokubo et al.

(10) Patent No.: US 8,443,772 B2
(45) Date of Patent: May 21, 2013

(54) ELECTRIC VALVE TIMING CONTROL DEVICE OF INTERNAL COMBUSTION ENGINE

(75) Inventors: Naoki Kokubo, Hiratsuka (JP); Atsushi Yamanaka, Atsugi (JP); Shinichi Kawada, Isehara (JP); Michinori Saito, Atsugi (JP); Koichiro Ono, Odawara (JP); Kazuhiko Takayanagi, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 339 days.

(21) Appl. No.: 12/760,155

(22) Filed: Apr. 14, 2010

(65) Prior Publication Data

US 2010/0269770 A1    Oct. 28, 2010

(30) Foreign Application Priority Data

Apr. 27, 2009    (JP) ................................. 2009-107357

(51) Int. Cl.
*F01L 1/34* (2006.01)
(52) U.S. Cl.
USPC ..................................... 123/90.15; 123/90.17
(58) Field of Classification Search
USPC ........................................... 123/90.15, 90.17
See application file for complete search history.

(56) References Cited

U.S. PATENT DOCUMENTS

| 5,979,382 | A * | 11/1999 | Heer ............................. 123/90.17 |
| 6,302,073 | B1 * | 10/2001 | Heer ............................. 123/90.17 |
| 6,561,149 | B1 * | 5/2003 | Kobayashi et al. ........ 123/90.17 |
| 7,624,710 | B2 * | 12/2009 | Uehama et al. ............ 123/90.17 |
| 7,703,425 | B2 | 4/2010 | Schafer et al. |
| 2003/0070642 | A1 * | 4/2003 | Todo et al. .................. 123/90.17 |
| 2005/0199201 | A1 * | 9/2005 | Schafer et al. ............. 123/90.17 |
| 2006/0201462 | A1 * | 9/2006 | Schafer et al. ............. 123/90.17 |
| 2007/0295294 | A1 * | 12/2007 | Morii et al. ................. 123/90.17 |
| 2008/0017149 | A1 | 1/2008 | Kokubo et al. |

(Continued)

FOREIGN PATENT DOCUMENTS

| JP | 52-18516 A | 2/1977 |
| JP | 11-107718 A | 4/1999 |

(Continued)

OTHER PUBLICATIONS

Laraminie, J. et al., Electronic Vehicles Explained, Chap. 6, 2003 John Wiley & Sons, Ltd.*
Laramine, et al., Electric Vehicle Technology Explained.*
Japanese Office Action dated Aug. 2, 2011 (three (3) pages).

(Continued)

*Primary Examiner* — Thomas Denion
*Assistant Examiner* — Steven D Shipe
(74) *Attorney, Agent, or Firm* — Crowell & Moring LLP

(57) ABSTRACT

A drive rotation member is driven by a crankshaft of the engine, and a driven rotation member is rotatable relative to the drive rotation member and secured to a cam shaft of the engine. An electric motor is arranged to rotate together with the drive rotation member and produces a dynamic power when fed with an electric current through brushes. A hollow control shaft is rotatable relative to the drive rotation member and forces the driven rotation member to rotate relative to the drive rotation member when rotated by the power of the electric motor. A bearing device is arranged between the driven rotation member and the hollow control shaft for smoothing a relative rotation therebetween. The bearing device includes a plurality of rollers. A lubrication oil feeding structure is provided for causing the rollers of the bearing device to be submerged in a lubrication oil at least when the engine is in operation.

19 Claims, 11 Drawing Sheets

U.S. PATENT DOCUMENTS

| | | | |
|---|---|---|---|
| 2008/0083388 A1* | 4/2008 | Uehama et al. | 123/90.17 |
| 2009/0272347 A1* | 11/2009 | Schafer et al. | 123/90.17 |
| 2010/0180844 A1* | 7/2010 | Uehama et al. | 123/90.17 |

FOREIGN PATENT DOCUMENTS

| | | | |
|---|---|---|---|
| JP | 2004-176744 A | | 6/2004 |
| JP | 2008-25456 A | | 2/2008 |
| JP | 2008-509339 A | | 3/2008 |
| WO | WO 2006074735 A1 | * | 7/2006 |
| WO | WO 2008149538 A1 | * | 12/2008 |

OTHER PUBLICATIONS

Translation of Excerpt from Japanese Laid-open Patent Application (Tokkaisho) 52-18516 submitted with the Information Disclosure Statement dated Sep. 7, 2011 (three (3) pages).

Translation of Excerpt from Japanese Laid-open Patent Japanese Laid-open Patent Application (Tokkai) 2004-176744 submitted with the Information Disclosure Statement dated Sep. 7, 2011 (two (2) pages).

* cited by examiner

ELECTRIC VALVE TIMING CONTROL DEVICE OF INTERNAL COMBUSTION ENGINE

BACKGROUND OF THE INVENTION

1. Field of the Invention

The present invention relates in general to electric valve timing control devices of an internal combustion engine, and more particularly to the electric valve timing control devices of a type that continuously varies open/close timing of engine valves (viz., intake valves and/or exhaust valves) with the aid of a phase varying mechanism powered by an electric motor.

2. Description of the Related Art

Hitherto, various timing control devices of an internal combustion engine have been proposed and put into practical use in the field of wheeled motor vehicles powered by the internal combustion engine. Some of them are of an electric type that exhibits a satisfied control response and controllability with the aid of a phase varying mechanism powered by an electric motor.

In some of the electric valve timing control devices of such type, the electric motor is constantly energized for rotation while a sprocket driven by a crankshaft of the engine rotates. This means that under operation of the engine, the electric motor is kept energized, which however brings about a marked energy loss of the engine.

Japanese Laid-open Patent Application (Tokkaihei) 11-107718 shows an electric valve timing control device that is constructed to eliminate or at least minimize the above-mentioned energy loss of the engine. In the control device of the publication, slip rings and brushes are employed for feeding the electric motor with an electric current and only when changing of the valve timing is needed, the electric motor is energized for rotation.

SUMMARY OF THE INVENTION

However, the electric valve timing control device of the above-mentioned publication tends to show the following undesirable phenomenon.

That is, in a certain operation condition of the engine, the electric motor of the electric valve timing control device is kept de-energized keeping the valve timing of the engine at a constant phase angle. In this case, a relative rotation between a rotor that is integral with a sun gear of a planetary gear unit (viz., speed reducer) and a hollow shaft that is provided around a cam bolt does not take place, and thus, the rotor and the hollow shaft tend to have undesired lack of oil film. Thus, when the electric motor becomes energized for changing the phase angle of the valve timing, an initial load that is applied to the electric motor is inevitably increased, which not only lowers the control response but also increases the energy loss of the engine.

Accordingly, it is an object of the present invention to provide an electric valve timing control device of an internal combustion engine, which is free of the above-mentioned drawbacks.

That is, in the present invention, at least when the engine is in operation, undesired lack of an oil film is suppressed or at least minimized between relative rotation members of the valve timing control device. For this purpose, actually rotating parts of such relative rotation members are submerged in a lubrication oil.

According to the present invention, the rotating parts of the relative rotation members are constantly submerged in a lubrication oil. Thus, lack of oil film of the rotation members is suppressed or at least minimized. Thus, the initial load that is applied to the electric motor upon energization of the motor is adequately reduced and thus, the response of the valve timing control is highly improved and energy loss of the engine is sufficiently reduced.

In accordance with a first aspect of the present invention, there is provided an electric valve timing control device of an internal combustion engine, which comprises a drive rotation member driven by a crankshaft of the engine; a driven rotation member rotatable relative to the drive rotation member and secured to a cam shaft of the engine to rotate together with the cam shaft; an electric motor arranged to rotate together with the drive rotation member, the electric motor producing a dynamic power when fed with an electric current through brushes; a hollow control shaft rotatable relative to the drive rotation member and forcing the driven rotation member to rotate relative to the drive rotation member when rotated by the power of the electric motor; a bearing device arranged between the driven rotation member and the hollow control shaft for smoothing a relative rotation therebetween, the bearing device including a plurality of rollers; and a lubrication oil feeding structure for causing the rollers of the bearing device to be submerged in a lubrication oil at least when the engine is in operation.

In accordance with a second aspect of the present invention, there is provided an electric valve timing control device of an internal combustion engine, which comprises a drive rotation member driven by a crankshaft of the engine; a driven rotation member rotatable relative to the drive rotation member and secured to a cam shaft of the engine to rotate together with the cam shaft; an electric motor arranged to rotate together with the drive rotation member, the electric motor producing a dynamic power when fed with an electric current through brushes; a supporting shaft member provided by either one of the drive rotation member and the driven rotation member; a hollow control shaft rotatably disposed about the supporting shaft member and forcing the driven rotation member to rotate relative to the drive rotation member when rotated by the power of the electric motor; a bearing device arranged between a cylindrical outer surface of the supporting shaft member and a cylindrical inner surface of the hollow control shaft for smoothing a relative rotation therebetween, the bearing device including a plurality of rollers; and a lubrication oil feeding structure for feeding a lubrication oil to an annular space defined between the cylindrical outer surface of the supporting shaft member and the cylindrical inner surface of the hollow control shaft.

In accordance with a third aspect of the present invention, there is provided an electric valve timing control device of an internal combustion engine, which comprises a drive rotation member driven by a crankshaft of the engine; a driven rotation member rotatable relative to the drive rotation member and secured to a cam shaft of the engine to rotate together with the cam shaft; a supporting shaft member provided by one of the drive rotation member and the driven rotation member; a hollow control shaft rotatably disposed about the supporting shaft member, the hollow control shaft forcing the driven rotation member to rotate relative to the drive rotation member when rotated; a bearing device arranged between a cylindrical outer surface of the supporting shaft member and a cylindrical inner surface of the hollow control shaft for smoothing a relative rotation therebetween, the bearing device including a plurality of rollers; a rotor unit tightly disposed on the hollow control shaft to rotate therewith, the rotor unit including a plurality of coils each being put around an iron core; a stator arranged to rotate together with the drive rotation member and having a magnetic flux producing portion; brushes through which electric current is fed to the coils of the rotor unit for producing magnetic fluxes; a rotation angle sensor arranged to detect an angular position of the driven rotation member; and a lubrication oil feeding structure that feeds the rollers of the bearing device with a lubrication oil.

BRIEF DESCRIPTION OF THE DRAWINGS

Other objects and advantages of the present invention will become apparent from the following description when taken in conjunction with the accompanying drawings, in which.

DETAILED DESCRIPTION OF INVENTION

In the following, an electric valve timing control device of an internal combustion engine according to the present invention will be described in detail with reference to the accompanying drawings.

The electric valve timing control device of the invention, which will be described in the following, is a device for controlling open/close timing of intake valves of an internal combustion engine. Of course, the electric valve timing control device of the present invention is applicable to exhaust valves of the engine.

In the following description, various directional terms, such as, right, left, upper, lower, rightward and the like are used. However, such terms are to be understood with respect to only a drawing or drawings on which a corresponding part or portion is shown.

Figure 2:
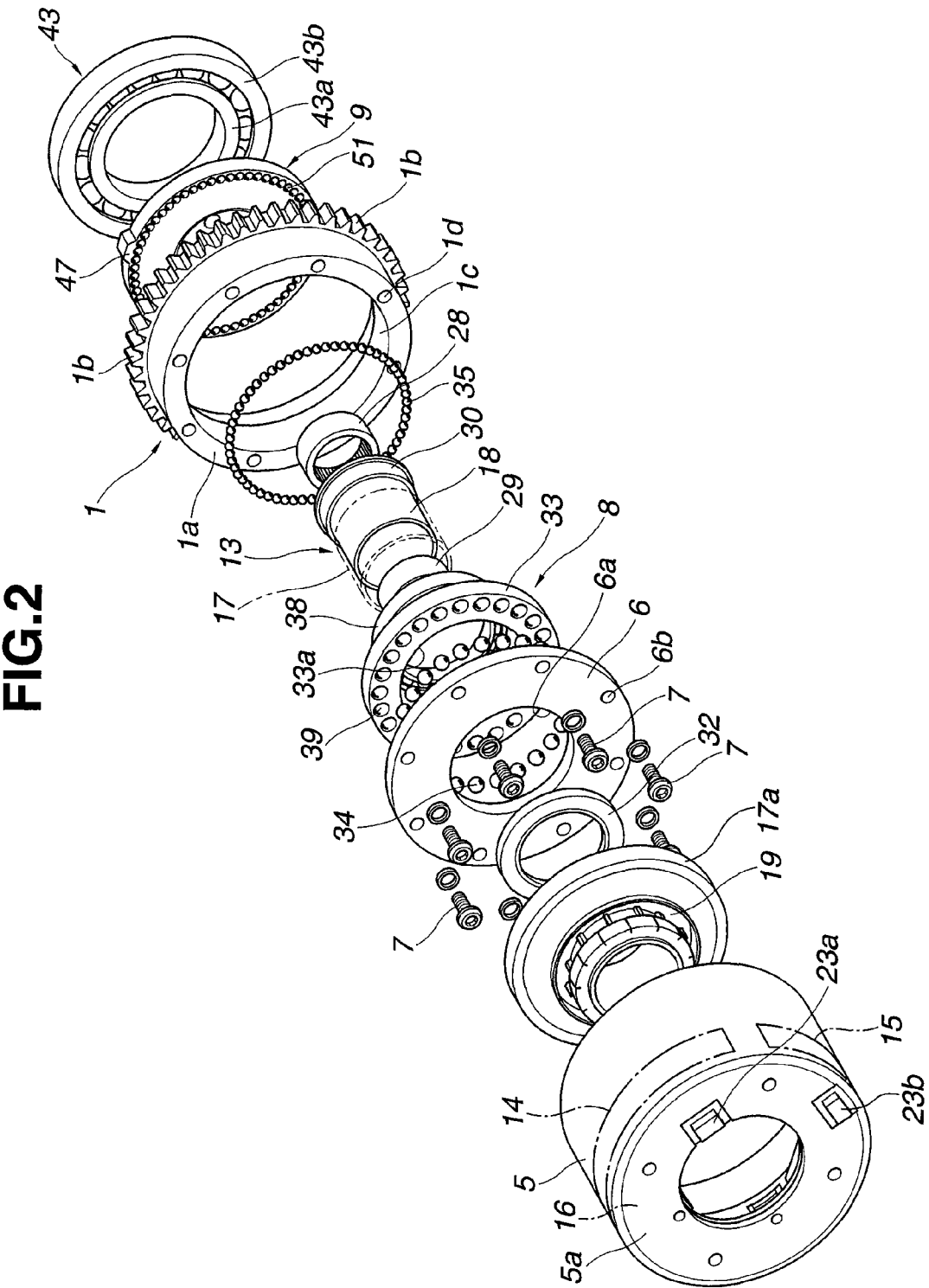
FIG. 2 is a perspective exploded view of the electric valve timing control device of the present invention.
Figure 3:
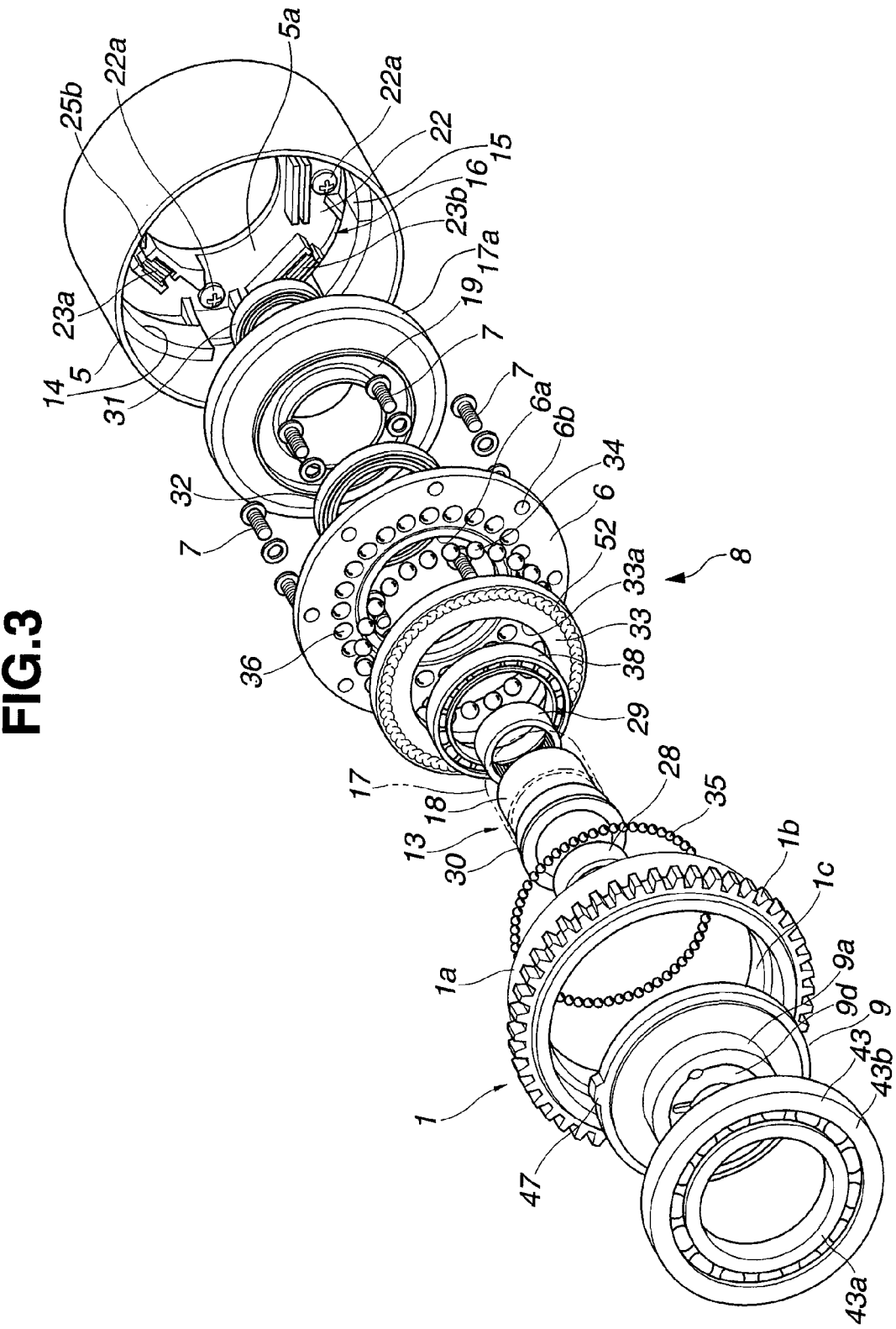
FIG. 3 is a view similar to FIG. 2, but showing a view taken in an opposite direction.
Figure 4:
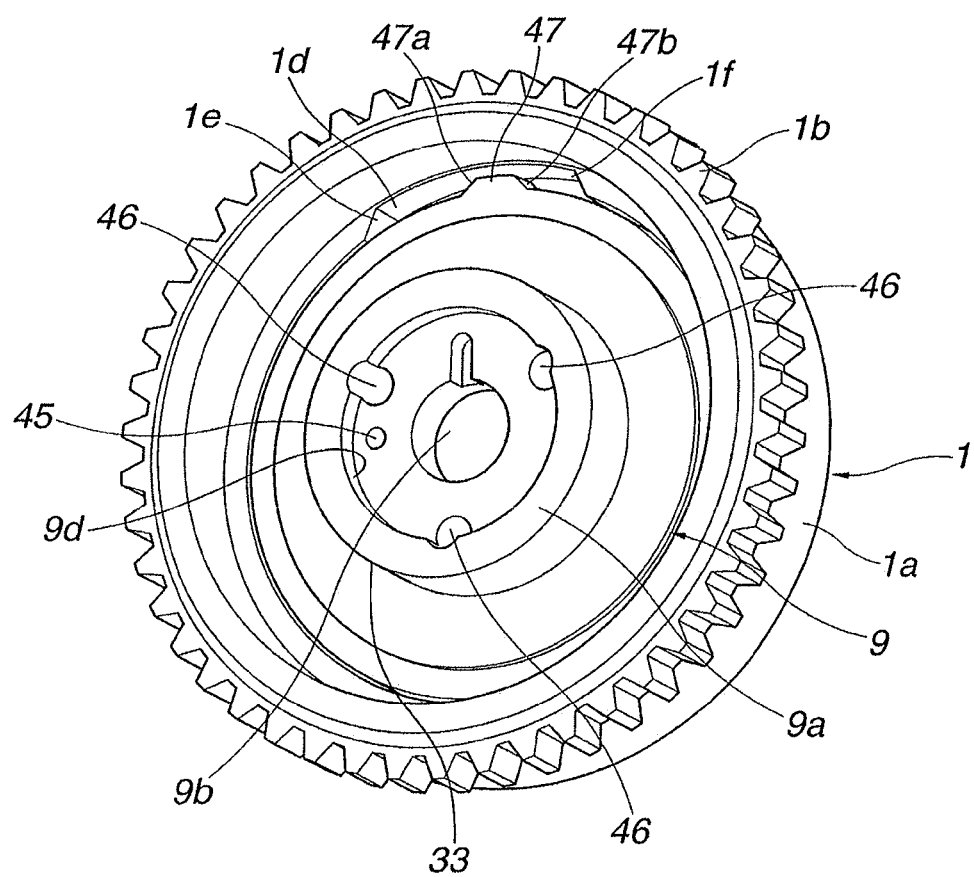
FIG. 4 is a perspective view of a timing sprocket and an annular follower plate, which are employed in the electric valve timing control device of the present invention.

As is seen from FIGS. 1 to 4, particularly FIG. 4, the electric valve timing control device (VTC) generally comprises a timing sprocket 1 that is driven by a crankshaft of an internal combustion engine, a cam shaft 2 that is rotatably held on a cylinder head through a bearing 44 and driven by a rotating force transmitted from timing sprocket 1, a cover member 3 that is arranged in front of timing sprocket 1 and secured to a chain cover (viz., fixing portion) 41 through bolts, and a phase varying mechanism 4 that is arranged between timing sprocket 1 and cam shaft 2 to continuously vary or change a rotation of cam shaft 2 relative to timing sprocket 1 in accordance with an operation condition of the engine.

As will be seen from FIGS. 2 and 3, timing sprocket 1 is a casting of iron material and forms one-piece construction. Timing sprocket 1 comprises an annular portion 1a that has a stepped cylindrical inner surface, and a gear portion 1b that is integrally formed on an axially rear end of annular portion 1a.

Figure 1:
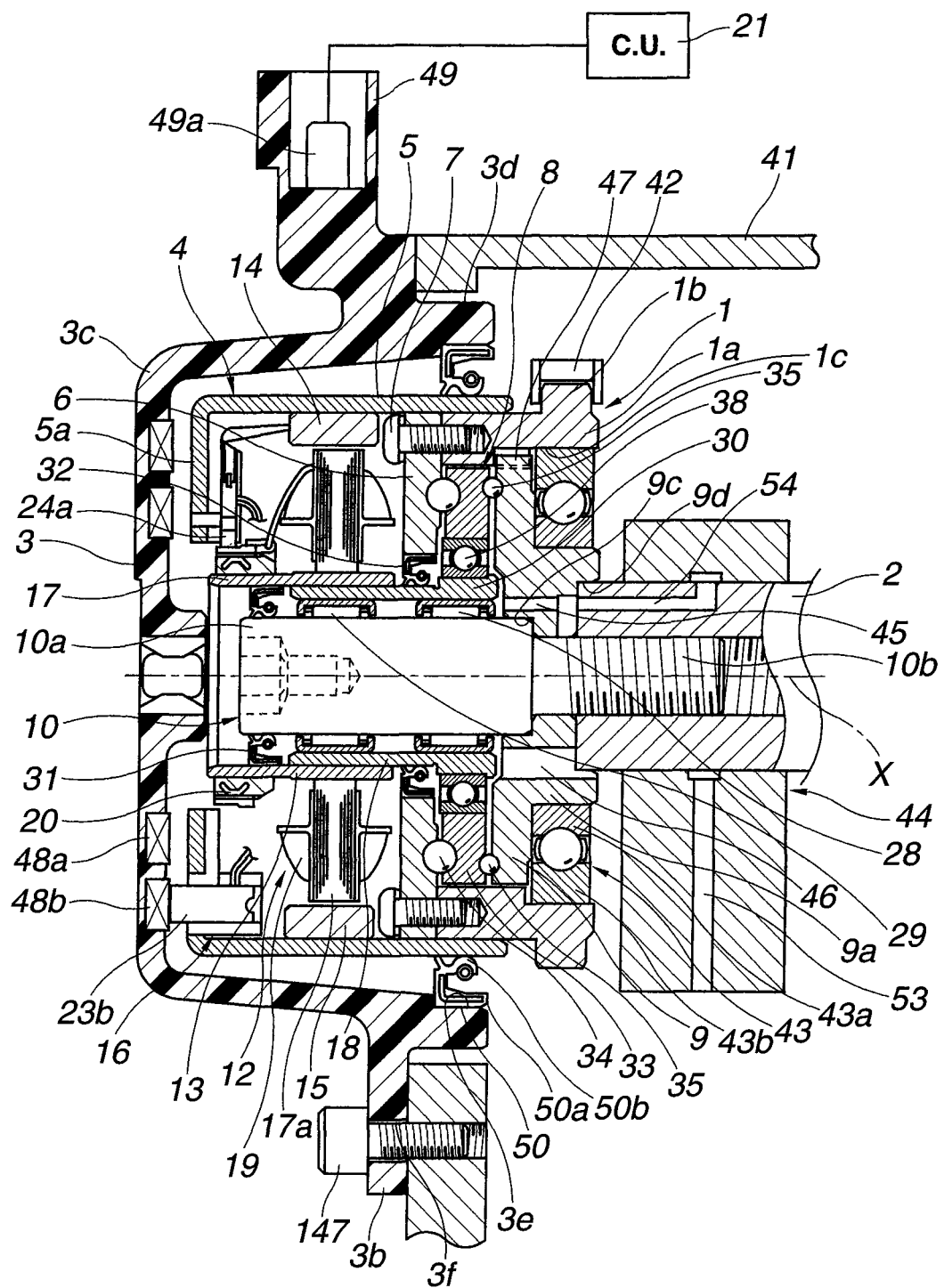
FIG. 1 is a sectional view of an electric valve timing control device of the present invention.

As is seen from FIG. 1, a timing chain 42 is operatively put on gear portion 1b of timing sprocket 1, so that a rotating force of the crankshaft of the engine is transmitted to timing sprocket 1 through the timing chain 42. A cylindrical inner surface 1c of annular portion 1a puts therein a ball bearing 43. More specifically, as is seen from FIG. 1, cylindrical inner surface 1c of annular portion 1a is disposed around an annular outer surface of an annular follower plate 9 through ball bearing 43, so that timing sprocket 1 is rotatable about annular follower plate 9.

As is seen from FIG. 1, onto a front (or left) end of annular portion 1a of timing sprocket 1, there is tightly disposed a leading (or right end) portion of a cylindrical housing 5 that houses therein an after-mentioned speed reduction device 8 and an electric motor 12 both of which constitute part of the above-mentioned phase varying mechanism 4. As shown in FIG. 1, an annular coupling plate 6 is received in cylindrical housing 5 and fixed to the left end of annular portion 1a of timing sprocket 1 by bolts 7.

As is seen from FIG. 4, the cylindrical inner surface of annular portion is of timing sprocket 1 is formed with an arcuate groove 1d that extends in a circumferential direction by a given length.

Referring back to FIG. 1, cylindrical housing 5 is constructed of iron material and serves as a yoke. As shown, cylindrical housing 5 is integrally formed at a left end thereof with an annular front portion 5a. As shown, cylindrical housing 5 is installed in cover member 3 leaving a certain annular space therebetween.

Although not shown in the drawings, cam shaft 2 is integrally formed with two drive cams for each cylinder of the engine, which function to open respective intake valves (not shown) under operation of the engine.

As shown in FIG. 1, the above-mentioned annular follower plate 9 is coaxially connected to a left end of cam shaft 2 by means of a cam bolt 10 which serves as a supporting shaft member for the annular follower plate 9.

As shown, cam bolt 10 comprises a larger diameter head portion 10a that has a generally same axial length as cylindrical housing 5 and a smaller diameter shaft portion 10*b* that has an external thread tightly meshed with an internal thread formed in cam shaft 2.

Thus, cam bolt 10 and cam shaft 2 rotate together like a single unit.

Annular follower plate 9 is constructed of an iron material and comprises a smaller diameter cylindrical portion 9*a* onto which an inner race 43*a* of the above-mentioned ball bearing 43 is tightly disposed and a larger diameter cylindrical portion of which right end surface abuts against a left end of ball bearing 43 to assure an axial positioning of ball bearing 43. As shown, the larger diameter cylindrical portion of annular follower plate 9 is formed, at a portion thereof facing an outer race 43*b* of ball bearing 43, with a recess (no numeral) for permitting rotation of outer race 43*b* relative to inner race 43*a*.

As is best seen from FIG. 4, the above-mentioned smaller diameter cylindrical portion 9*a* is formed with a center bore 9*b* into which smaller diameter shaft portion 10*b* of cam bolt 10 is inserted.

As is seen from FIG. 1, annular follower plate 9 is formed at a left end thereof with an annular center recess 9*c* into which a right end of the above-mentioned larger diameter head portion 10*a* of cam bolt 10 is tightly inserted. Furthermore, annular follower plate 9 is formed at a right end with an annular center recess 9*d* into which a left end of cam shaft 2 is tightly inserted.

Thus, cam bolt 10, cam shaft 2 and annular follower plate 9 rotate together like a single unit.

As is seen from FIGS. 1 and 4, from annular center recess 9*d*, there extends axially and leftward an oil feeding smaller diameter passage 45 that constitutes part of an after-mentioned lubrication oil feeding structure. Furthermore, around annular center recess 9*d*, there extend axially three oil discharging larger diameter passages 46.

As is seen from FIG. 4, the three larger diameter passages 46 are equally spaced from one another in a circumferential direction.

As is seen from this drawing, annular follower plate 9 concentrically received in timing sprocket 1 is formed at an outer periphery thereof with a projected stopper portion 47 that is slidably received in the above-mentioned arcuate groove 1*d* formed in timing sprocket 1. As shown, projected stopper portion 47 has a generally trapezoidal shape. Due to provision of opposed inclined surfaces 47*a* and 47*b* of projected stopper portion 47 that are respectively brought into abutment with opposed inclined surfaces 1*e* and 1*f* of arcuate groove 1*d*, the maximum advanced and retarded angular positions of cam shaft 2 relative to timing sprocket 1 are defined.

Figure 5:
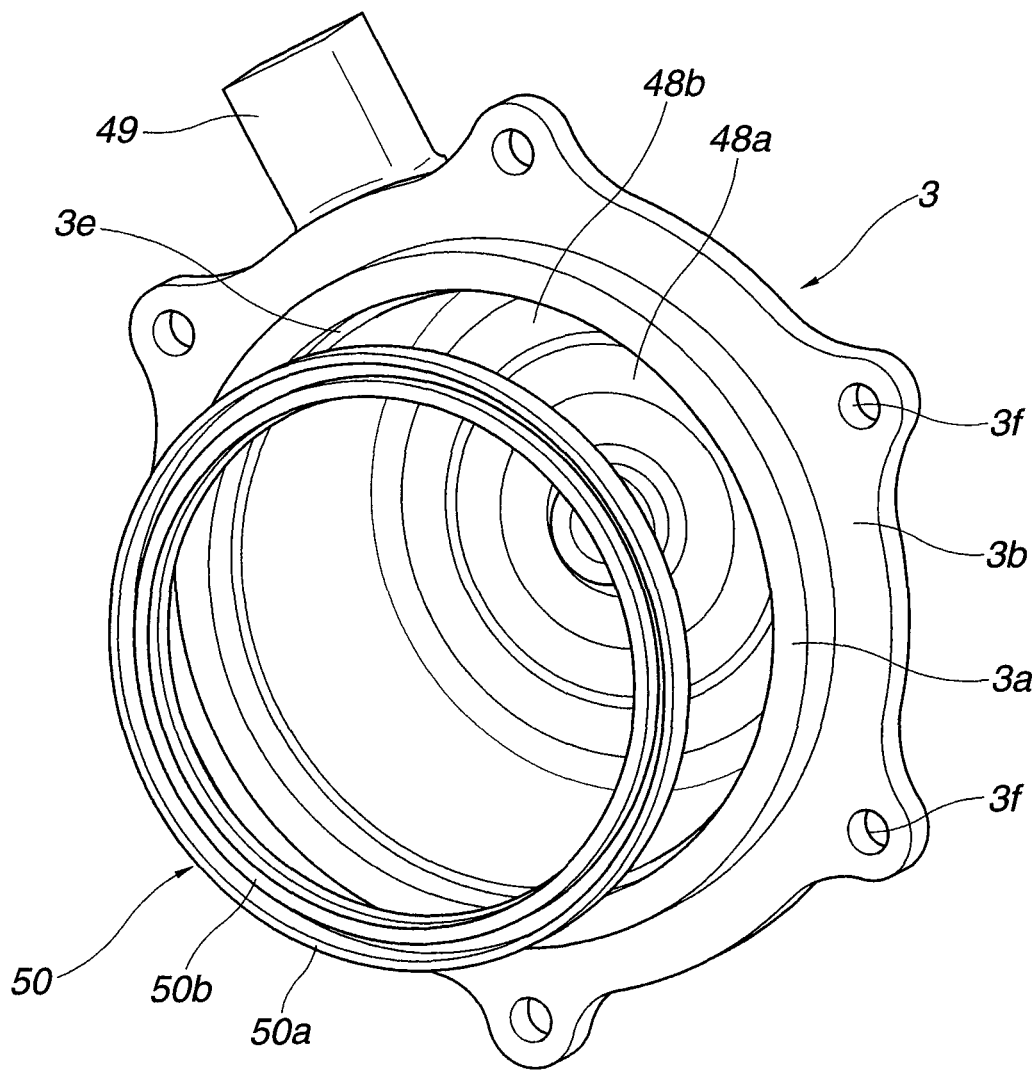
FIG. 5 is a perspective view of a cover member and a first oil seal, which are employed in the electric valve timing control device of the present invention.

As is seen from FIGS. 1 and 5, cover member 3 is a one-piece member constructed of a molded plastic. More specifically, cover member 3 is produced by using an integral molding technique. As shown, cover member 3 generally comprises a cover proper 3*a* that is shaped like a cup and a bracket portion 3*b* that is integrally formed on an outer surface of cover proper 3*a*.

As is seen from FIG. 1, cover proper 3*a* is shaped and arranged to cover a left end portion of the above-mentioned phase varying mechanism 4. More specifically, cover proper 3*a* covers a generally entire portion of cylindrical housing 5 leaving a certain space therebetween. Furthermore, cover proper 3*a* has a tapered major portion that extends from a diametrically smaller left end 3*c* to a diametrically larger right end 3*d*. Accordingly, the larger right end 3*d* has the maximum diameter. As is seen from FIG. 5, bracket portion 3*b* of cover member 3 is formed with equally spaced six bolt holes 3*f* each being provided in an enlarged boss portion of bracket portion 3*b*.

Referring back to FIG. 1, bracket 3*b* of cover member 3 is secured to the above-mentioned chain cover 41 by means of six connecting bolts 147 passing through the bolts holes 3*f*.

As shown in this drawing, smaller and larger slip rings 48*a* and 48*b* are secured to an inner surface of the front (or left as viewed in FIG. 1) end portion of cover proper 3*a* in such a manner that slip rings 48*a* have 48*b* have respective inside surfaces exposed to the interior of cover proper 3*a*. Due to usage of the integral molding technique for molding cover member 3, slip rings 48*a* and 48*b* are secured or bonded to the front end of cover member 3 without usage separate connecting members.

As is seen in FIG. 1, cover member 3 is formed at an upper portion thereof with a connector holding portion 49 by which a connector 49*a* is held. Although not shown in the drawing, the connector 49*a* is connected to the above-mentioned smaller and larger slip rings 48*a* and 48*b* through conducting members that are embedded in cover member 3. The connector 49*a* is connected to a control unit 21 and a battery (not shown) through cables (not shown). By the control unit 21, feeding of electric current to electric motor 12 through the two slip rings 48*a* and 48*b* is controlled as will be clearly described hereinafter.

As is seen from FIG. 1, between an inner surface of the diametrically larger right end 3*d* of cover proper 3*a* and an outer surface of a right end portion of cylindrical housing 5, there is operatively disposed a third oil seal 50 of which shape is clearly shown in FIG. 5.

As shown in FIG. 1, third oil seal 50 has a generally U-shaped cross section and comprises an annular base portion constructed of synthetic rubber and a core metal ring installed in the annular base portion. An annular outer portion 50*a* of third oil seal 50 is tightly disposed in an annular recess 3*e* formed in the inner surface of the diametrically larger right end 3*d* of cover proper 3*a*. It is thus to be noted that the third oil seal 50 is placed near gear portion 1*b* of timing sprocket 1. An annular inner portion (or sealing lip) 50*b* of third oil seal 50 is pressed against the outer surface of cylindrical housing 5 with the force of the core metal ring (or back-up spring), so that hermetical sealing is achieved between the sealing lip 50*b* and the outer surface of cylindrical housing 5.

As is understood from FIG. 1, phase varying mechanism 4 generally comprises the electric motor 12 that is coaxially disposed around head portion 10*a* of bolt cam 10 to serve as an actuator and the speed reduction device 8 that transmits a torque of electric motor 12 to cam shaft 2 while reducing a rotation speed.

As is seen from FIG. 1, electric motor 12 is of a DC type having brushes 23*a*, 23*b*, 24*a* and 24*b* (see FIG. 6) and comprises the cylindrical housing (or yoke) 5 that rotates together with timing sprocket 1, a hollow control shaft 13 that is rotatable in cylindrical housing 5, a rotor unit that is tightly disposed on hollow control shaft 13 to rotate together with shaft 13, paired arcuate permanent magnets 14 and 15 that are secured to the cylindrical inner surface of cylindrical housing 5 (see FIG. 6), and a stator 16 that is fixed to annular front portion 5*a* of cylindrical housing 5.

Hollow control shaft 13 comprises a larger diameter cylindrical hollow shaft 17 that is an armature and a smaller diameter cylindrical hollow shaft 18 that is tightly disposed in larger diameter cylindrical shaft 17 and operatively connected to an input side of speed reduction device 8. That is, hollow control shaft 13 serves as an output shaft of electric motor 12. For ease of understanding, smaller diameter cylindrical shaft 18 will be referred to as "motor shaft" in the following description.

As is seen from FIG. 1, two cylindrical hollow shafts 17 and 18 are axially offset relative to each other. More specifically, the two shafts 17 and 18 are so connected that the shaft 18 projects rightward by a given distance from a right end of the other shaft 17. Due to difference of the diameter, there is inevitably produced an annular step (no numeral) between the two shafts 17 and 18 as shown.

Larger diameter cylindrical shaft 17 is provided at a right end outer portion thereof with a plurality of iron cores 17a that are equally spaced from one another in a circumferential direction, each iron core 17a being wound by a coil 19. Furthermore, about a front end of the shaft 17, there is tightly disposed a commutator 20. To this commutator 20, there are connected coils 19 in a known manner.

Figure 6:
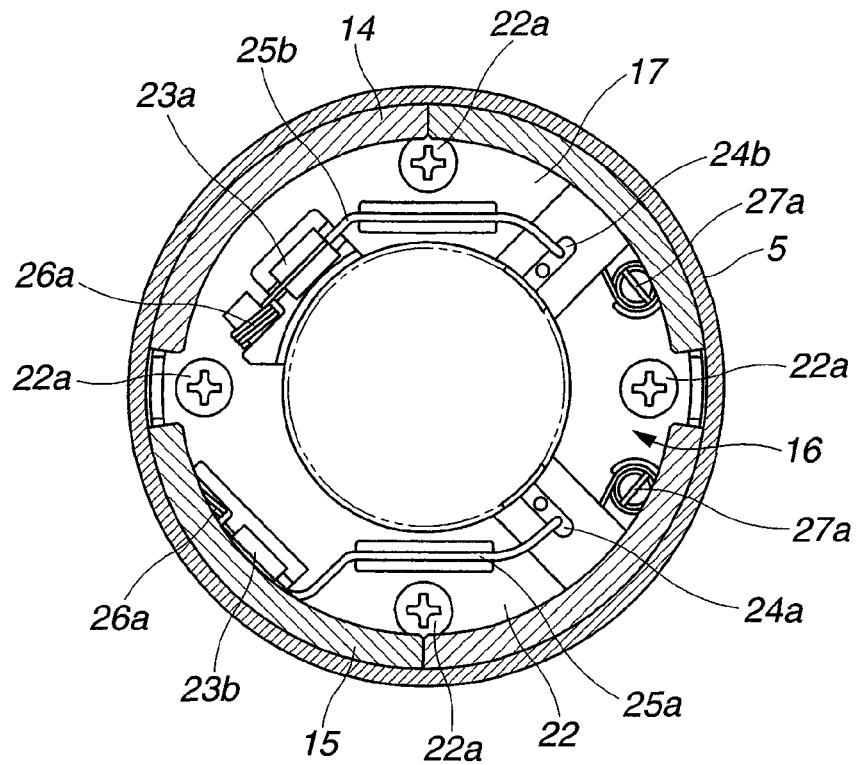
FIG. 6 is a front view of a stator of an electric motor employed in the electric valve timing control device of the present invention, the stator being installed in a cylindrical housing.

As will be understood from FIGS. 1, 3 and 6, stator 16 generally comprises an annular plastic holder 22 that is fixed through four screws 22a to an inner surface of annular front portion 5a of cylindrical housing 5, two first brushes 23a and 23b that pass through both holder 22 and annular front portion 5a and have left ends (as viewed in FIG. 1) slidably contacting the above-mentioned smaller and larger slip rings 48a and 48b respectively, and two second brushes 24a and 24b that are radially movably held by holder 22 and have concave inner ends slidably contacting two annular conducting paths provided on a cylindrical outer surface of the above-mentioned commutator 20.

As is seen from FIG. 6, two first brushes 23a and 23b and two second brushes 24a and 24b are connected through pig tail harnesses 25a and 25b. Due to provision of biasing springs 26a and 27a, two first brushes 23a and 23b are biased toward the two slip rings 48a and 48b and two second brushes 24a and 24b are biased toward the two annular conducting paths of commutator 20.

As is seen from FIG. 1, smaller diameter cylindrical shaft 18 is rotatably held, together with larger diameter cylindrical shaft 17, by the cylindrical outer surface of larger head portion 10a of cam bolt 10 through two needle bearings 28 and 29.

As is seen from FIGS. 1, 2 and 3, the right end (as viewed in FIG. 1) of smaller diameter cylindrical hollow shaft (or motor shaft) 18 is integrally formed with an eccentric cam 30 that forms part of speed reduction device 8. Each of needle bearings 28 and 29 comprises a cylindrical retainer and a plurality of needle rollers rotatably received in the retainer.

Between the cylindrical inner surface of larger diameter cylindrical shaft 17 and the cylindrical outer surface of larger head portion 10a of cam bolt 10, there is operatively provided a first oil seal (viz., first seal member) 31 that blocks oil leakage from the area of needle bearings 28 and 29 toward the area of stator 16.

Between the cylindrical inner surface of annular coupling plate 6 and the cylindrical outer surface of motor shaft 18, there is operatively provided a second oil seal (viz., second seal member) 32 that blocks oil leakage from the interior of speed reduction device 8 toward the interior of electric motor 12.

Upon receiving and processing information signals from a crank angle sensor, an air flow meter, an engine cooling water temperature sensor, an accelerator operation degree sensor, etc., (all of which are not shown), control unit 21 detects or realizes a current operation condition of the engine and suitably controls the operation of the engine with reference to the detected operation condition. Furthermore, based on the detected operation condition of the engine, control unit 21 controls the electric current fed to coils 19 of the iron cores 17a provided on larger diameter cylindrical shaft 17 so as to control rotation (or rotation speed) of motor shaft 18 (or control shaft 13). Thus, with the aid of speed reduction device 8, the rotation phase angle of cam shaft 2 relative to timing sprocket 1 can be controlled.

As is seen from FIGS. 1, 2 and 3, speed reduction device 8 generally comprises annular coupling plate 6, annular follower plate 9, an annular eccentric drive plate 33 operatively disposed between annular coupling plate 6 and annular follower plate 9, eccentric cam 30 integrally formed on right end (as viewed in FIG. 1) of motor shaft 18 to force annular eccentric drive plate 33 to move eccentrically, a plurality of metal balls 34 operatively disposed between annular coupling plate 6 and annular eccentric drive plate 33 and a plurality of metal balls 35 operatively disposed between annular eccentric drive plate 33 and annular follower plate 9. As is seen from the drawings, metal balls 35 are smaller in diameter than metal balls 34. By varying the number of metal balls 34 and 35, the speed reduction ratio established by the speed reduction device 8 can be varied.

As is seen from FIGS. 1, 2 and 3, annular coupling plate 6 is constructed of a metal and has at a center portion thereof a shaft opening 6a for receiving therein motor shaft 18 through second oil seal 32. Annular coupling plate 6 has further at a peripheral portion thereof equally spaced eight bolt holes 6b for receiving bolts 7.

As is seen from FIGS. 1 and 2, eight bolts 7 passing through bolts holes 6b are engaged with respective threaded bolt holes 1d of the above-mentioned annular portion is of timing sprocket 1, so that annular coupling plate 6 is tightly fixed to one axial end of the annular portion 1a. Thus, annular coupling plate 6 and timing sprocket 1 rotate like a single unit.

Figure 7:
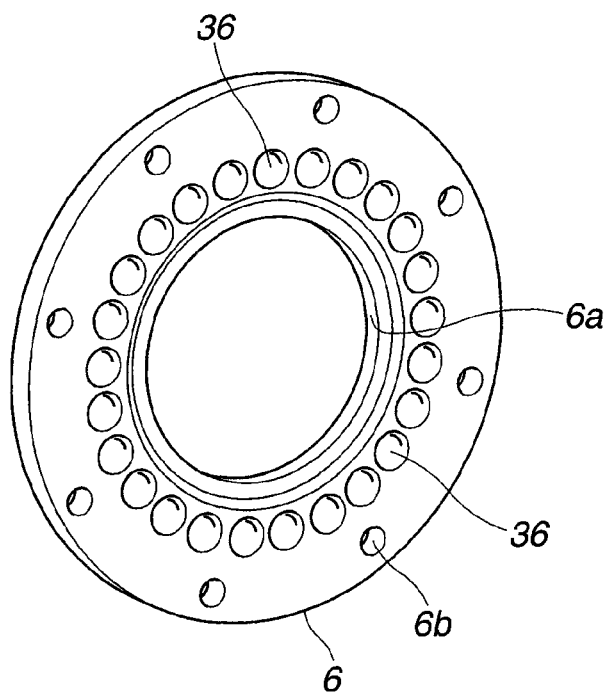
FIG. 7 is a perspective view of an annular coupling plate employed in the electric valve timing control device of the present invention.
Figure 9:
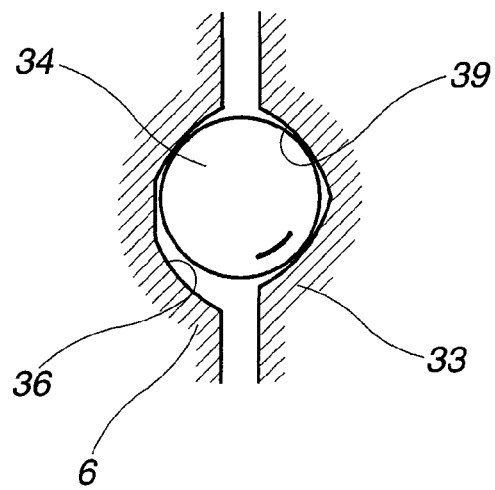
FIG. 9 is an enlarged sectional view of an essential portion of a unit that includes the annular coupling plate, the annular eccentric drive plate and metal balls.

As is seen from FIGS. 3, 7 and 9, annular coupling plate 6 has, at one surface thereof facing annular eccentric drive plate 33, a plurality of eccentric recesses 36 which are circularly arranged around shaft opening 6a at evenly spaced intervals.

As is seen from FIG. 9, each eccentric recess 36 has a relatively large diameter for permitting both rotation and eccentric shift of metal ball 34 therein. That is, eccentric recesses 36 are arranged and shaped so as to permit an eccentric movement of annular eccentric drive plate 33.

Figure 8:
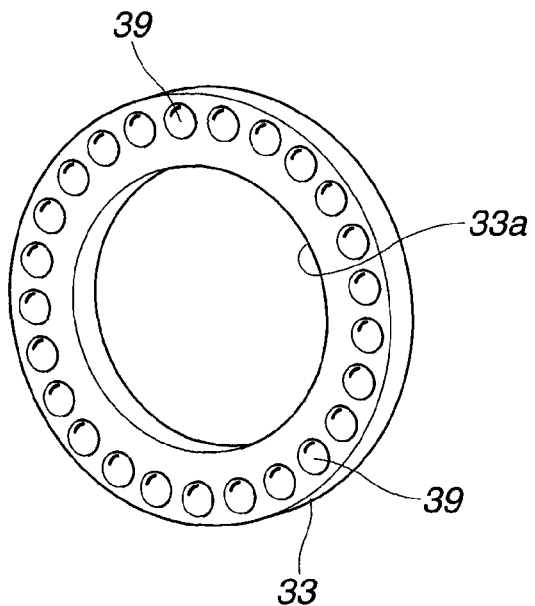
FIG. 8 is a perspective view of an annular eccentric drive plate employed in the electric valve timing control device of the present invention, showing one side of the annular eccentric drive plate.

As is seen from FIGS. 1, 2 and 8, annular eccentric drive plate 33 is constructed of a metal and has at a center portion thereof a circular opening 33a in which the above-mentioned eccentric cam 30 is rotatably received through a ball bearing 38. As shown, annular eccentric drive plate 33 has an outer diameter smaller than that of annular coupling plate 6 and that of annular follower plate 9, and is compactly housed in the annular portion 1a while being permitted to make the eccentric movement.

As is seen from FIGS. 2, 8 and 9, annular eccentric drive plate 33 has, at one surface thereof facing coupling plate 6, a plurality of holding recesses 39 that are arranged around circular opening 33a at evenly spaced intervals. As is seen from FIG. 9, each holding recess 39 receives a part of metal ball 34. That is, holding recesses 39 of annular eccentric drive plate 33 and eccentric recesses 36 of the above-mentioned annular coupling plate 6 are arranged to face one another to rotatably put therebetween metal balls 34. Each holding recess 39 is shaped to have a spherical surface to permit only rotation of metal ball 34.

Because of the equally spaced positioning of holding recesses 39, the equally spaced positioning of eccentric recesses 36 and metal balls 34 received by both the recesses 39 and 36, relative inclination between annular eccentric drive plate 33 and annular coupling plate 6 is suppressed or at least minimized, and thus, under operation, needed eccentric movement of annular eccentric drive plate 33 relative to annular coupling plate 6 is smoothly and exactly carried out.

As is seen from FIGS. 1, 2, 3, 11 and 12, annular follower plate 9 has, at one surface thereof facing annular eccentric drive plate 33, a plurality of circular recesses 51 that are arranged around a center opening 9b (see FIG. 11) thereof at evenly spaced intervals. As will be understood from FIG. 2, such circular recesses 51 partially receive the above-mentioned metal balls 35 respectively and serve as a first guide means that forms a cycloidal curve. For ease of understanding, the number of circular recesses 51 will be represented by "N".

Figure 10:
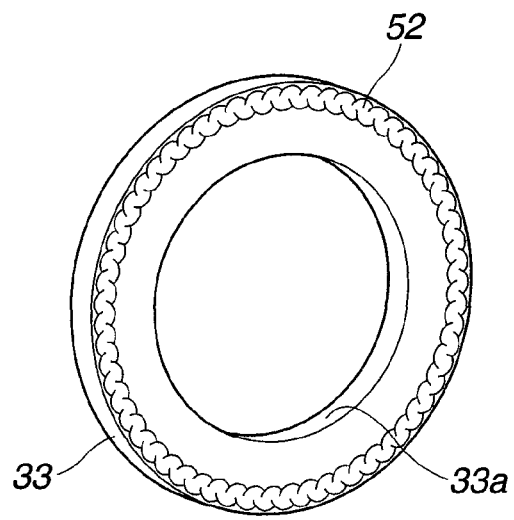
FIG. 10 is a view similar to FIG. 8, but showing the other side of the eccentric drive plate.
Figure 11:
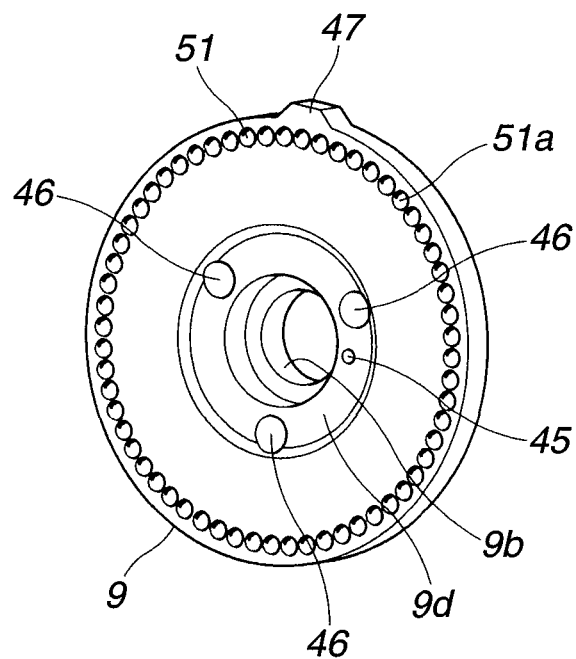
FIG. 11 is a perspective view of the annular follower plate, showing one side of the same.

As is seen from FIGS. 3 and 10, annular eccentric drive plate 33 has, at the other surface thereof facing annular follower plate 9, a trochoidal groove 52 which is arranged to extend around circular opening 33a of the annular eccentric drive plate 33. Upon assembly, the trochoidal groove 52 partially receives metal balls 35 and serves as a second guide means. As is seen from FIG. 10, the trochoidal groove 52 is provided around a peripheral portion of annular eccentric drive plate 33 and includes a plurality of circular recesses spaced by the same pitch.

Figure 12:
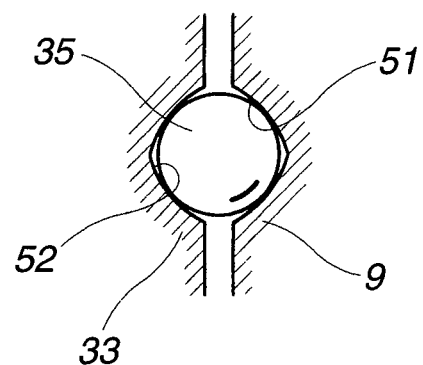
FIG. 12 is an enlarged sectional view of an essential portion of a unit that includes the annular eccentric drive plate, the annular follower plate and metal balls.

As is seen from FIG. 12, trochoidal groove 52 has a generally triangular cross section with a bottom part showing the minimum area.

The above-mentioned lubrication oil feeding structure functions to feed the interior of speed reduction device 8 with a lubrication oil.

As is seen from FIG. 1, the lubrication oil feeding structure to generally comprises an oil flow passage 53 that is formed in bearing 44 of the cylinder head and fed with the lubrication oil from a main oil gallery (not shown), an axially extending oil flow passage 54 that is formed in cam shaft 2 and connected to the oil flow passage 53 through an annular groove (no numeral) formed in bearing 44, and the above-mentioned oil feeding smaller diameter passage 45 that is formed in annular follower plate 9 and has one end exposed to the oil flow passage 54 and the other end exposed to an open space to which the above-mentioned needle bearing 28 is exposed, and the above-mentioned three oil discharging larger diameter passages 46 that are formed in annular follower plate 9.

In the following, operation of the electric valve timing control device of the invention will be described with the aid of the drawings, particularly FIG. 1.

For ease of understanding, the description will be commenced with respect to a condition wherein the electric valve timing control device is at rest keeping electric motor 12 de-energized.

When now the engine is started to operate, the crankshaft is rotated. The rotation of the crankshaft is transmitted through timing chain 42 to timing sprocket 1 to rotate the same. Due to rotation of timing sprocket 1, the entire construction of electric motor 12 is rotated together with cylindrical housing 5 and annular coupling plate 6.

During this, the rotation of annular coupling plate 6 is transmitted to cam shaft 2 through metal balls 34, annular eccentric drive plate 33, metal balls 35 and annular follower plate 9. Thus, the cams on cam shaft 2 function to open and close corresponding intake valves (not shown).

When, due to some reasons, the engine is brought to a certain operation condition, control unit 21 functions to feed the coils 19 of electric motor 12 with a controlled current through the two slip rings 48a and 48b. Upon this, motor shaft 18 is turned in a given direction resulting in that cam shaft 2 is turned at a reduced speed through speed reduction device 8.

That is, when, due to rotation of motor shaft 18, eccentric cam 30 integral with the motor shaft 18 is rotated, annular eccentric drive plate 33 is forced to make an eccentric movement relative to annular coupling plate 6 through a combined power transmitting unit including eccentric recesses 36, holding recesses 39 and metal balls 34 operatively received in both eccentric recesses 36 and holding recesses 39. The eccentric movement of annular eccentric drive plate 33 forces annular follower plate 9 to rotate with a movement of metal balls 35 that are placed at an intersection zone between an imaginary circle defined by circular recesses 51 and another imaginary circle defined by the circular trochoidal groove 52. The speed reduction ratio established in this case is represented by "1:N−1" relative to rotation of eccentric cam 30.

With the above-mentioned operation, cam shaft 2 having thereon the cams is turned in a selected direction relative to timing sprocket 1, so that the open/close timing of intake valves of the engine is advanced or retarded.

As is seen from FIG. 4, once the projected stopper portion 47 of annular follower plate 9 is brought into abutment with one of the opposed inclined surfaces 1e and 1f of actuate groove 1d of timing sprocket 1, cam shaft 2 assumes the maximum advanced phase angle or the maximum retarded phase angle relative to timing sprocket 1.

That is, when, due to the eccentric movement of annular eccentric drive plate 33, annular follower plate 9 is forced to rotate in the same direction as timing sprocket 1, the projected stopper portion 47 (more specifically, inclined surface 47a of the stopper portion 47) is brought into abutment with the inclined surface 1e and thus further rotation of annular follower plate 9 relative to timing sprocket 1 is suppressed. In this case, cam shaft 2 assumes the maximum advanced phase angle relative to timing sprocket 1.

While, when, due to the eccentric movement of annular eccentric drive plate 33, annular follower plate 9 is forced to rotate in a direction opposite to that of timing sprocket 1, the projected stopper portion 47 (more specifically, the other inclined surface 47b of stopper portion 47) is brought into abutment with the other inclined surface 1f and thus further rotation of annular follower plate 9 relative to timing sprocket 1 is suppressed. In this case, cam shaft 2 assumes the maximum retarded phase angle relative to timing sprocket 1.

For the reasons as mentioned hereinabove, the open/close timing of the intake valves of the engine is changed to the maximum advanced side or maximum retarded side. As is easily understood, the internal combustion engines having such valve timing control device can exhibit a satisfied performance in fuel consumption and power.

As is described hereinabove, due to provision of a so-called stopper means that includes projected stopper portion 47 of annular follower plate 9 and arcuate groove 1d of timing sprocket 1, maximum turning of cam shaft 2 relative to timing sprocket 1 is assuredly restricted.

Under operation of the engine, the speed reduction device 8 is enforcedly fed with a lubrication oil from the lubrication oil feeding structure through smaller diameter passage 45. Thus, all of essential parts of speed reduction device 8 are adequately lubricated by the lubrication oil. Furthermore, due to introduction of such lubrication oil, metal balls 34 in eccentric recesses 36 and holding recesses 39 and metal balls 35 in circular recesses 51 and trochoidal groove 52 are also adequately lubricated by the lubrication oil. Accordingly, the phase varying operation by speed reduction device 8 is smoothly and assuredly carried out under operation of the engine. Furthermore, because the lubrication oil is sufficiently fed to the parts of speed reduction device 8, noises produced when the parts strike on one another are suppressed or at least minimized.

The lubrication oil fed from smaller diameter passage 45 to speed reduction device 8 is directly applied to two needle bearings 28 and 29. Thus, lubrication of these bearings 28 and 29 is improved.

Due to provision of the above-mentioned lubrication oil feeding structure, under operation of the engine, the two needle bearings 28 and 29 are submerged in the lubrication oil fed from the oil pump.

Accordingly, the needle rollers of the two bearings 28 and 29 are prevented from undesired lack of oil film. Thus, undesired increase of the initial load of the electric motor 12 is prevented or at least minimized, and thus, the operation response of the valve timing control is sufficiently improved and the energy loss of the engine is sufficiently reduced.

Figure 13A:
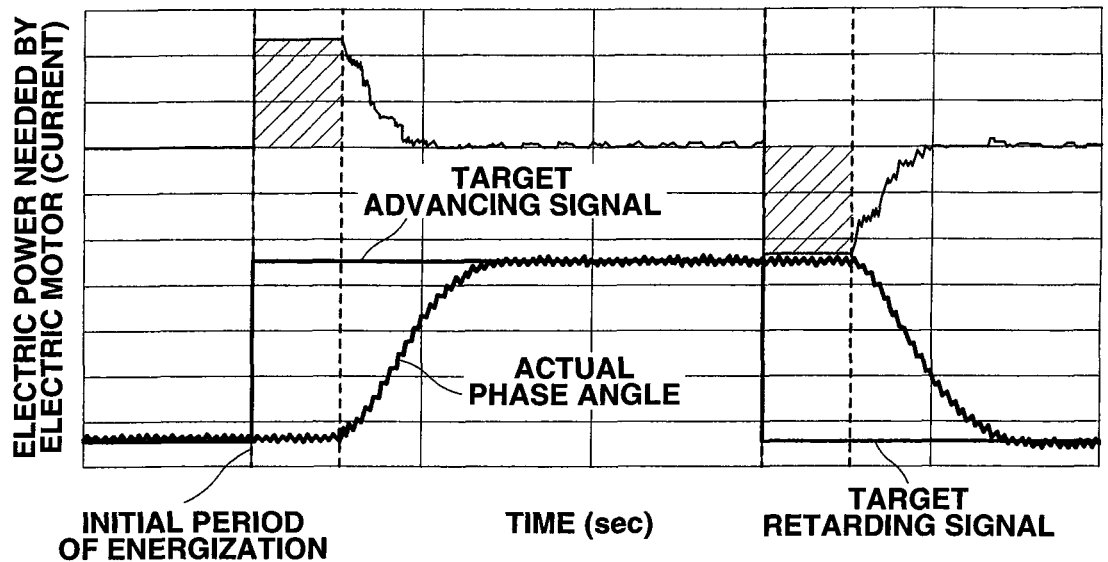
FIG. 13A is a graph showing a performance characteristic of a known electric valve timing control device in terms of a relationship between an electric power (or current) needed by an electric motor and an elapsed time.
Figure 13B:
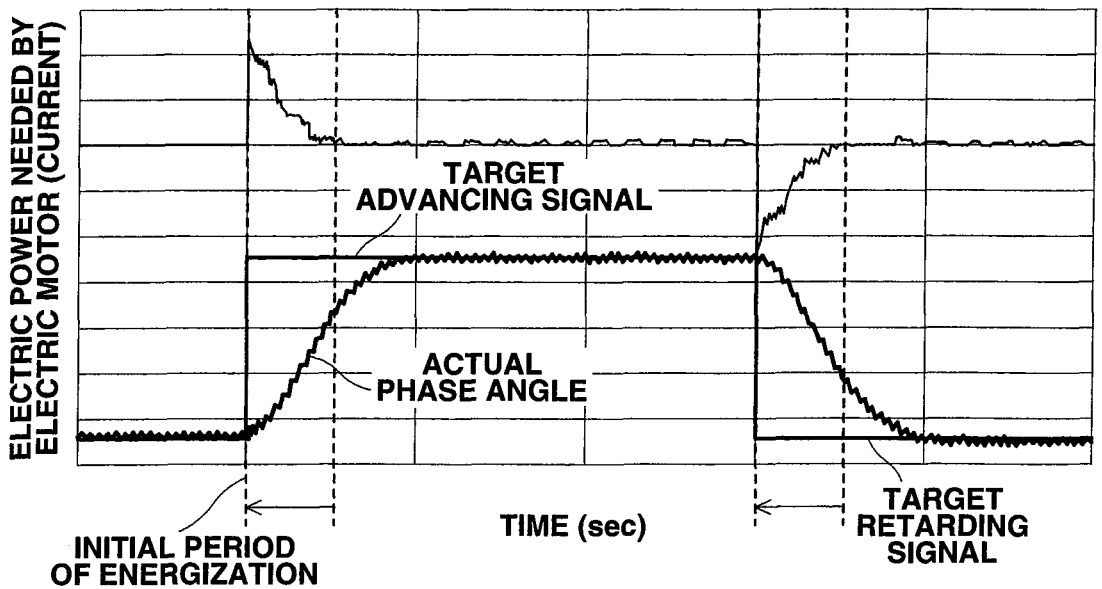
FIG. 13B is a graph similar to FIG. 13A, but showing a performance characteristic of the electric valve timing control device of the present invention.

The above-mentioned advantages of the present invention will be much clarified from the following description that is directed to the graphs of FIGS. 13A and 13B.

FIG. 13A is a graph showing a performance characteristic of a known electric valve timing control device in terms of a relation between an elapsed time and a power (or current) needed by an electric motor 12 at the time of varying the phase. In this known electric valve timing control device, the motor shaft 8 is directly and rotatably disposed on the cylindrical outer surface of cam bolt 10 without usage of any bearing means such as the above-mentioned needle bearings 28 and 29.

FIG. 13B is a graph similar to FIG. 13A, but showing a performance characteristic of the electric valve timing control device of the present invention. In this device, the two needle bearings 28 and 29 are practically employed in the above-mentioned manner.

In these graphs FIGS. 13A and 13B, the straight solid line represents a target phase angle, a zigzag solid line represents an actual phase angle and a zigzag solid thin line represents electric current (or power).

As is seen from the graph of FIG. 13A, in the known device in which motor shaft 18 is directly and rotatably disposed on cam bolt 10, the following phenomena appear. That is, at an initial period of feeding electric current to coils 19 of electric motor 12 for changing the phase angle toward an advanced side, the rise time of rotation of motor shaft 18 (or control shaft 13) relative to the target phase angle is delayed or retarded. In other words, the operation response of the electric motor 12 and thus the operation response of the valve timing control device is lowered. Furthermore, in case of changing the phase angle from the advanced side toward the retarded side, the operation response of electric motor 12 (and thus, operation response of the valve timing control device) is also lowered. This means that energy-loss by an amount represented by the slashed blocks in the graph of Fig. A is produced. Inventors consider that such poor operation response is caused by lack of oil film that would appear between motor shaft 18 and cam bolt 10.

While, as is seen from the graph of FIG. 13B, in the electric valve timing control device of the present invention that practically uses needle bearings 28 and 29, the following phenomena appear. That is, when, for changing the operation phase angle toward an advanced side or a retarded side, coils 19 of electric motor 12 are energized, motor shaft 18 exhibits a quick rise of rotation, which brings about an improved operation response of electric motor 12 (and thus improved operation response of the valve timing control device) and satisfied reduction of energy-loss of the engine.

That is, with the use of needle bearings 28 and 29, undesired lack of oil film between motor shaft 18 and cam bolt 10 is suppressed. Furthermore, since, in the invention, needle bearings 28 and 29 are sufficiently submerged in the lubrication oil, the operation response and the reduction of the energy-loss are much effectively promoted.

In the invention, ball bearings may be used as a substitute for the needle bearings 28 and 29. However, in view of compactness and cost, usage of needle bearings 28 and 29 is preferable.

Due to provision of first and second oil seals 31 and 32, the lubrication oil fed to speed reduction device 8 is prevented from entering the interior of electric motor 12, and due to provision of third oil seal 50, the lubrication oil discharged from speed reduction device 8 through three oil discharging larger diameter passages 46 is suppressed from flowing toward two first brushes 23a and 23b and two slip rings 48a and 48b. Accordingly, undesired adhesion or deposition of the lubrication oil onto such brushes 23a and 23b and slip rings 48a and 48b is suppressed, and thus, current feeding to electric motor 12 is assuredly carried out.

Under operation of the engine, the lubrication oil discharged from speed reduction device 8 through three oil discharging larger diameter passages 46 is applied to ball bearings 43 and gear portion 1b of timing sprocket 1 by the work of centrifugal force. Thus, such ball bearings 43 and gear portion 1b are effectively lubricated. The lubrication oil adhering to gear portion 1b is splashed radially outward by the work of centrifugal force, and the splashed lubrication oil is then applied to a cylindrical outer surface of the rear end (or right end as viewed in FIG. 1) of cylindrical housing 5 and to sealing lip 50b of third oil seal 50. Accordingly, undesired wear of the sealing lip 50b of third oil seal 50 is suppressed or at least minimized.

As is seen from FIG. 1, since third oil seal 50 is arranged near gear portion 1b of timing sprocket 1, the sealing lip 50b can be applied with an adequate volume of lubrication oil from gear portion 1b of timing sprocket 1.

Control shaft 13 is produced by coaxially and telescopically combing two hollow shafts 17 and 18 that are similar in construction. Thus, production of control shaft 13 is easily made, and an axial length of control shaft 13 is easily changed by changing a degree by which hollow shaft 18 is inserted into the hollow shaft 17. By using a press-fitting technique, two hollow shafts 17 and 18 are coaxially and telescopically connected. Thus, for production of control shaft 13, there is no need of using troublesome steps of enlarging the diameter of hollow shaft 17.

First oil seal 31 is installed in a relatively large annular space defined between the cylindrical inner surface of larger diameter cylindrical shaft 17 and the cylindrical outer surface of cam bolt 10 and, second oil seal 32 is installed in an annular space defined between the cylindrical outer surface of motor shaft 18 and the cylindrical inner surface of annular coupling plate 6. Thus, the respective annular spaces for first and second oil seals 31 and 32 are assuredly obtained even when the diameter of control shaft 13 reduces due to usage of needle bearings 28 and 29. Thus, first and second oil seals 31 and 32 can be easily set and mounted to their proper positions with a simple mounting work.

Eccentric cam 30 is integrally formed on one end of control shaft 13 (more specifically, motor shaft 18). Thus, reduction of parts count is established.

Since cam shaft 10 is arranged to serve as a supporting shaft member for annular follower plate 9, there is no need of employing a separate supporting member for the follower plate 9. Thus, reduction of parts count is established. Since cam bolt 10 is screwed into cam shaft 2 to constitute a coaxial unit, radial play of cam bolt 10 relative to cam shaft 2 is prevented and thus the coaxial unit can exhibit its performance for a long time.

Due to usage of cylindrical housing 5, speed reduction device 8 and electric motor 12 are combined to constitute a combined structure and at the same time, due to provision of annular portion is of timing sprocket 1, the combined structure can be integrally combined with timing sprocket 1. That is, unitization of the electric valve timing control device of the invention is achieved. Furthermore, the electric valve timing control device can be made compact in size.

Since cover member 3 is constructed of a molded plastic, lightweight construction of the engine is achieved. Furthermore, since, due to the nature of the integral molding, slip rings 48a and 48b are automatically bonded to cover member 3 when cover member 3 is molded, troublesome manual work which would be needed when slip rings 48a and 48b are secured to cover member 3 by the separate connecting members is not needed, which facilitates production of the electric valve timing control device.

Figure 14:
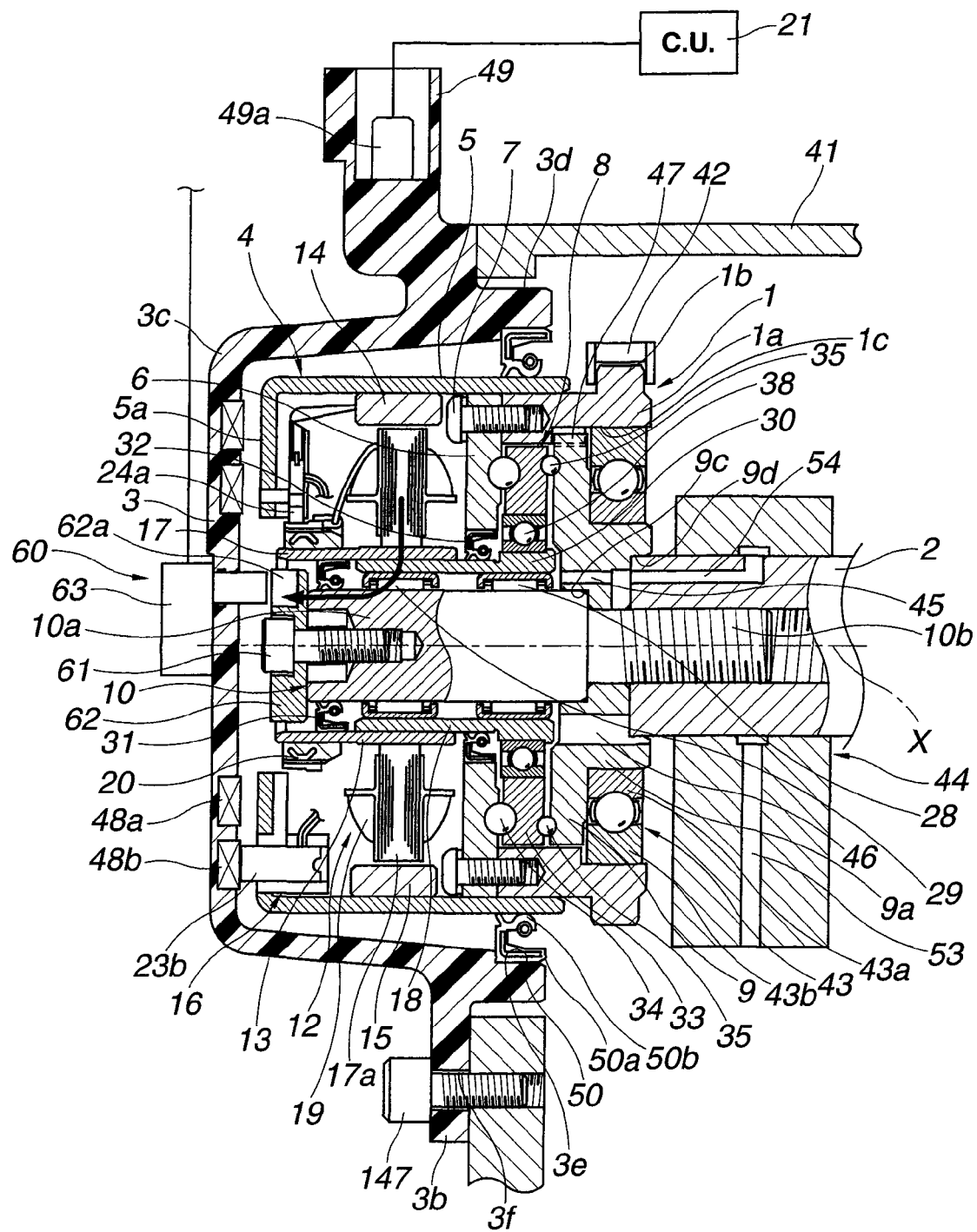
FIG. 14 is a view similar to FIG. 1, but showing a first modification of the electric valve timing control device of the present invention.
Figure 15:
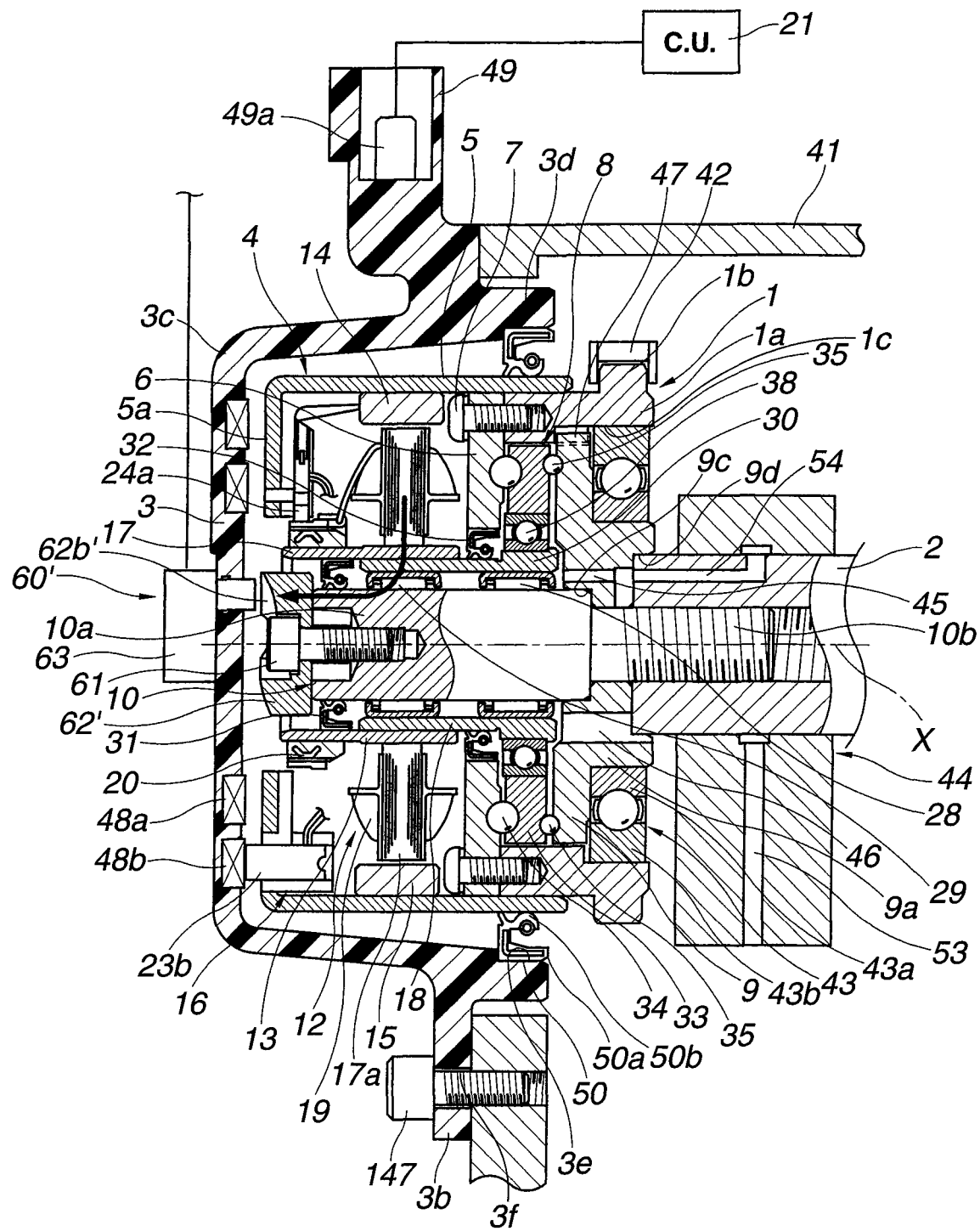
FIG. 15 is a view similar to FIG. 1, but showing a second modification of the electric valve timing control device of the present invention.

Referring to FIGS. 14 and 15, there are shown first and second modifications of the electric valve timing control device of the present invention.

In these modifications, rotation angle sensors 60 and 60' are respectively employed which sense a rotation angle of cam shaft 2. The sensors 60 and 60' may be the same as those disclosed in Japanese Laid-open Patent Application (Tokkai) 2008-25456.

In the first modification of FIG. 14, rotation angle sensor 60 is of a magnetic pickup type, which comprises a circular detected member 62 that is fixed through a bolt 61 to a leading end (viz., left end as viewed in FIG. 14) of head portion 10a of cam bolt 10 and a position detector 63 that is fixed to a central area of left end 3c of cover member 3 to detect a rotation angle of circular detected member 62. Position detector 63 is connected through a cable to control unit 21. When position detector 63 is energized, magnetic fluxes are produced by position detector. However, due to provision of detected member 62 which rotates, the produced magnetic fluxes are forced to change its shape. Based on the change of magnetic fluxes detected by position detector 63, control unit 21 calculates an angular position of detected member 62 and thus that of cam shaft 2.

Circular detected member 62 is formed at a peripheral portion thereof with a plurality of spaced recesses and projections (or targets) 62a each being placed between adjacent two recesses. Due to provision of such projections 62a, the magnetic fluxes produced by position detector 63 are suitably changed in shape, and a signal representing the change is fed to control unit 21 as an information signal.

As will be understood from FIG. 14, under operation of the engine, other magnetic fluxes as shown by a thicker arrow are inevitably produced by essential parts (viz., iron cores 17a and permanent magnets 14) of electric motor 12, which tend to affect the performance of rotation angle sensor 60.

However, it has been revealed that usage of needle bearings 28 and 29 between motor shaft 18 and cam bolt 10 exhibits a sufficient resistance against such undesired magnetic fluxes. If such needle bearings 28 and 29 are not provided, such magnetic fluxes may affect the performance of rotation angle sensor 60 by a considerable level. If desired, in place of needle bearings 28 and 29, full float bearings may be used.

Mounting circular detected member 62 to the leading end of head portion 10a of cam bolt 10 means an effective use of a dead space.

In the second modification of FIG. 15, rotation angle sensor 60' is substantially the same as the above-mentioned rotation angle sensor 60 except a circular detected member 62'.

That is, the circular detected member 62' used in the second modification has a stepped front surface including tapered projections 62b' which are arranged to constitute so-called endless circular stairs. This type of detected member 62' is disclosed in the above-mentioned Japanese Publication 2008-25456. It has been revealed that due to provision of the stepped front surface of detected member 62', the rotation angle sensor 60' has a performance higher than that of the above-mentioned sensor 60. Of course, due to provision of needle bearings 28 and 29, undesired magnetic fluxes produced by the elements of electric motor 12 are sufficiently blocked and thus, the detecting performance of position detector 63 is not affected.

The following modifications may be employed also in the present invention.

If desired, third oil seal 50 may be arranged in a reversed connecting manner. In this reversed arrangement, annular portion 50a is secured to cylindrical housing 5 and the other annular portion (or sealing lip) 50b is in contact with a bottom surface of annular recess 3e of cover member 3.

Furthermore, if desired, cover proper 3a of cover member 3 may have a proper cylindrical form that has a common diameter throughout the axial length thereof. In this modification, the proper cylindrical cover proper has a larger diameter rear end for receiving chain cover 41.

Furthermore, if desired, a supporting shaft member connected with timing sprocket 1 may be used as a substitute for the cam bolt 10. Also in this case, control shaft 13 is rotatably dispose on the supporting shaft member through the two needle bearings 28 and 29.

The entire contents of Japanese Patent Application 2009-107357 filed Apr. 27, 2009 are incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. An electric valve timing control device of an internal combustion engine, comprising:
a drive rotation member driven by a crankshaft of the engine;
a driven rotation member rotatable relative to the drive rotation member and secured to a cam shaft of the engine to rotate together with the cam shaft;
an electric motor arranged to rotate together with the drive rotation member, the electric motor producing a dynamic power when fed with an electric current through brushes;
a housing arranged to rotate together with the drive rotation member and having the electric motor housed therein;
a hollow control shaft received in the housing in a manner to be rotatable relative to the housing and rotated by the dynamic power of the electric motor;
a speed reduction device that transmits a rotation of the hollow control shaft to the driven rotation member while reducing a speed of the rotation; and
a bearing device arranged between a cylindrical outer surface of the driven rotation member and a cylindrical inner surface of the hollow control shaft, the bearing device including a plurality of rollers;

wherein a lubrication oil feeding structure is provided for causing the rollers of the bearing device to be submerged in a lubrication oil at least when the engine is in operation.

2. An electric valve timing control device of an internal combustion engine, comprising:
   a drive rotation member driven by a crankshaft of the engine;
   a driven rotation member rotatable relative to the drive rotation member and secured to a cam shaft of the engine to rotate together with the cam shaft;
   an electric motor arranged to rotate together with the drive rotation member, the electric motor producing a dynamic power when fed with an electric current through brushes;
   a housing arranged to rotate together with the drive rotation member and having the electric motor housed therein;
   a supporting shaft member provided by either one of the drive rotation member and the driven rotation member;
   a hollow control shaft received in the housing and rotatably disposed about an outer cylindrical surface of the supporting shaft member and rotated by the dynamic power of the electric motor;
   a speed reduction device that transmits a rotation of the hollow control shaft to the driven rotation member while reducing a speed of the rotation;
   a bearing device arranged between a cylindrical outer surface of the supporting shaft member and a cylindrical inner surface of the hollow control shaft, the bearing device including a plurality of rollers; and
   a lubrication oil feeding structure for feeding a lubrication oil to an annular space defined between the cylindrical outer surface of the supporting shaft member and the cylindrical inner surface of the hollow control shaft.

3. An electric valve timing control device as claimed in claim 2, in which the bearing device is a needle bearing that uses needles as rollers.

4. An electric valve timing control device as claimed in claim 2, in which the supporting shaft member is a cam bolt for fixing the driven rotation member to the cam shaft.

5. An electric valve timing control device as claimed in claim 2, in which a first seal member is operatively disposed in a cylindrical space defined between the supporting shaft member and the hollow control shaft to suppress a flow of the lubrication oil in the cylindrical space in the direction from a rear end portion to a front end portion.

6. An electric valve timing control device as claimed in claim 5, in which the hollow control shaft comprises larger and smaller diameter cylindrical hollow shafts which are coaxially connected to each other, the first seal member being operatively disposed between a cylindrical inner surface of the larger diameter cylindrical hollow shaft and a cylindrical outer surface of the supporting shaft member.

7. An electric valve timing control device as claimed in claim 6, in which the larger and smaller diameter cylindrical hollow shafts are press-fitted to each other in a manner to form an annular step on the hollow control shaft.

8. An electric valve timing control device as claimed in claim 6, in which the speed reduction device is arranged beside the electric motor in a manner to surround the hollow control shaft, in which the smaller diameter cylindrical hollow shaft is arranged between the speed reduction device and the electric motor, and in which a second seal member is operatively disposed between a cylindrical outer surface of the smaller diameter cylindrical hollow shaft and a cylindrical inner surface of an annular element of the speed reduction device thereby to achieve a hermetical sealing between the speed reduction device and the electric motor.

9. An electric valve timing control device as claimed in claim 8, in which the driven rotation member is formed with an oil flow passage through which the lubrication oil is fed to an interior of the speed reduction device.

10. An electric valve timing control device as claimed in claim 8, in which the hollow control shaft comprise a larger diameter cylindrical hollow shaft and a smaller diameter cylindrical hollow shaft that has one end portion tightly received in the larger diameter cylindrical hollow shaft, and in which a rear end of the larger diameter cylindrical hollow shaft is spaced from a rear end of the smaller diameter cylindrical hollow shaft by a given distance.

11. An electric valve timing control device as claimed in claim 8, in which the speed reduction device comprises:
    an eccentric cam provided by the hollow control shaft;
    an annular eccentric drive plate operatively disposed about the eccentric cam thereby to make an eccentric movement thereof when the eccentric cam turns;
    a plurality of metal balls operatively disposed between the annular eccentric drive plate and the driven rotation member;
    a first guide means provided by one of the driven rotation member and the annular eccentric drive plate for operatively receiving the metal balls, the first guide means forming a cycloidal curve;
    a second guide means provided by the other of the driven rotation member and the annular eccentric drive plate for permitting revolution of the metal balls;
    an annular coupling plate arranged to face the annular eccentric drive plate and connected to the drive rotation member; and
    a coupling mechanism arranged between the annular eccentric drive plate and the annular coupling plate to permit only an eccentric movement of the annular eccentric drive plate relative to the annular coupling plate.

12. An electric valve timing control device as claimed in claim 11, in which the second seal member is connected to the annular coupling plate, the second seal member and the annular coupling plate constituting a partition wall that is arranged between the electric motor and the speed reduction device.

13. An electric valve timing control device as claimed in claim 11, in which the coupling mechanism comprises:
    a plurality of eccentric recesses provided by one of the annular eccentric drive plate and the annular coupling plate, each eccentric recess having a diameter that corresponds to an eccentric degree of the annular eccentric drive plate; and
    a plurality of metal balls operatively disposed in the eccentric recesses and rotatably interposed between the annular eccentric drive plate and the annular coupling plate.

14. An electric valve timing control device as claimed in claim 13, in which the other one of the annular eccentric drive plate and the annular coupling plate is formed with a plurality of recesses that rotatably receive the metal balls in a manner to permit only rotation of the metal balls.

15. An electric valve timing control device of an internal combustion engine, comprising:
    a drive rotation member driven by a crankshaft of the engine;
    a driven rotation member rotatable relative to the drive rotation member and secured to a cam shaft of the engine to rotate together with the cam shaft;

an electric motor arranged to rotate together with the drive rotation member, the electric motor producing a dynamic power when fed with an electric current through brushes;
a housing arranged to rotate together with the drive rotation member and having the electric motor housed therein;
a supporting shaft member provided by either one of the drive rotation member and the driven rotation member;
a hollow control shaft received in the housing and rotatably disposed about an outer cylindrical surface of the supporting shaft member and rotated by the dynamic power of the electric motor;
a speed reduction device that transmits a rotation of the hollow control shaft to the driven rotation member while reducing a speed of the rotation;
a bearing device arranged between a cylindrical outer surface of the supporting shaft member and a cylindrical inner surface of the hollow control shaft, the bearing device including a plurality of rollers; and
a lubrication oil feeding structure for feeding a lubrication oil to an annular space defined between the cylindrical outer surface of the supporting shaft member and the cylindrical inner surface of the hollow control shaft;
wherein a first seal member is operatively disposed in a cylindrical space defined between the supporting shaft member and the hollow control shaft to suppress a flow of the lubrication oil in the cylindrical space in the direction from a rear end portion to a front end portion;
wherein the hollow control shaft comprises larger and smaller diameter cylindrical hollow shafts which are coaxially connected to each other, the first seal member being operatively disposed between a cylindrical inner surface of the larger diameter cylindrical hollow shaft and a cylindrical outer surface of the supporting shaft member;
wherein the speed reduction device is arranged beside the electric motor in a manner to surround the hollow control shaft, in which the smaller diameter cylindrical hollow shaft is arranged between the speed reduction device and the electric motor, and in which a second seal member is operatively disposed between a cylindrical outer surface of the smaller diameter cylindrical hollow shaft and a cylindrical inner surface of an annular element of the speed reduction device thereby to achieve a hermetical sealing between the speed reduction device and the electric motor;
wherein the speed reduction device comprises:
an eccentric cam provided by the hollow control shaft;
an annular eccentric drive plate operatively disposed about the eccentric cam thereby to make an eccentric movement thereof when the eccentric cam turns;
a plurality of metal balls operatively disposed between the annular eccentric drive plate and the driven rotation member;
a first guide means provided by one of the driven rotation member and the annular eccentric drive plate for operatively receiving the metal balls, the first guide means forming a cycloidal curve;
a second guide means provided by the other of the driven rotation member and the annular eccentric drive plate for permitting revolution of the metal balls;
an annular coupling plate arranged to face the annular eccentric drive plate and connected to the drive rotation member; and
a coupling mechanism arranged between the annular eccentric drive plate and the annular coupling plate to permit only an eccentric movement of the annular eccentric drive plate relative to the annular coupling plate;
wherein the coupling mechanism comprises:
a plurality of eccentric recesses provided by one of the annular eccentric drive plate and the annular coupling plate, each eccentric recess having a diameter that corresponds to an eccentric degree of the annular eccentric drive plate; and
a plurality of metal balls operatively disposed in the eccentric recesses and rotatably interposed between the annular eccentric drive plate and the annular coupling plate;
in which each of the metal balls of the coupling mechanism is larger in diameter than that of the metal balls operatively disposed between the annular eccentric drive plate and the driven rotation member.

16. An electric valve timing control device of an internal combustion engine, comprising:
a drive rotation member driven by a crankshaft of the engine;
a driven rotation member rotatable relative to the drive rotation member and secured to a cam shaft of the engine to rotate together with the cam shaft;
a supporting shaft member provided by either one of the drive rotation member and the driven rotation member;
a hollow control shaft rotatably disposed about a cylindrical outer surface of the supporting shaft member and rotated by a dynamic power of an electric motor;
a speed reduction device that transmits a rotation of the hollow control shaft to the driven rotation member while reducing a speed of the rotation;
a bearing device arranged between a cylindrical outer surface of the supporting shaft member and a cylindrical inner surface of the hollow control shaft, the bearing device including a plurality of rollers;
a rotor unit tightly disposed on the hollow control shaft to rotate therewith, the rotor unit including a plurality of coils each being put around an iron core;
a stator arranged to rotate together with the drive rotation member and arranged around the rotor unit;
an electromagnetic coil provided by either one of the rotor unit and the stator and producing a plurality of different magnetic fields in circumferential directions when fed with electric power from outside through brushes;
a magnetic flux producing portion provided by the other of the rotor unit and the stator and producing a plurality of different magnetic fields in circumferential directions;
a housing arranged to rotate together with the drive rotation member and having the rotor unit, the electromagnetic coil and the magnetic flux producing portion installed therein;
a rotation angle sensor arranged at an axial end position of the hollow control shaft and capable of detecting an angular position of the driven rotation member; and
a lubrication oil feeding structure that feeds the rollers of the bearing device with a lubrication oil.

17. An electric valve timing control device as claimed in claim 16, in which the rotation angle sensor is of a type that detects change of a shape of magnetic fluxes.

18. An electric valve timing control device as claimed in claim 16, in which the magnetic flux producing portion of the rotor unit comprises a plurality of permanent magnets that surround the rotor unit.

19. An electric valve timing control device as claimed in claim 16, in which the rotation angle sensor is arranged on an extension part of an axis of the hollow control shaft.

* * * * *